US010454390B2

(12) United States Patent
Colby

(10) Patent No.: US 10,454,390 B2
(45) Date of Patent: Oct. 22, 2019

(54) DETECTION OF INITIAL MOTOR ROTATION IN MAINS-FED INDUCTION MOTOR

(71) Applicant: SCHNEIDER ELECTRIC USA, INC., Andover, MA (US)

(72) Inventor: Roy S. Colby, Raleigh, NC (US)

(73) Assignee: Schneider Electric USA, Inc., Andover, MA (US)

(*) Notice: Subject to any disclaimer, the term of this patent is extended or adjusted under 35 U.S.C. 154(b) by 5 days.

(21) Appl. No.: 15/715,204

(22) Filed: Sep. 26, 2017

(65) Prior Publication Data

US 2019/0097549 A1 Mar. 28, 2019

(51) Int. Cl.
*H02P 1/26* (2006.01)
*H02P 1/02* (2006.01)

(52) U.S. Cl.
CPC ............ *H02P 1/022* (2013.01); *H02P 1/26* (2013.01); *H02P 2207/01* (2013.01)

(58) Field of Classification Search
CPC .... G01R 22/00; G01R 21/06; G05B 19/4065; G05B 2219/37008; G05B 2219/37348; G05B 2219/37498
See application file for complete search history.

(56) References Cited

U.S. PATENT DOCUMENTS

| | | | | |
|---|---|---|---|---|
| 5,003,252 A | * | 3/1991 | Nystrom | G01R 31/34 324/765.01 |
| 6,483,291 B1 | * | 11/2002 | Bhateja | G01R 22/00 324/107 |
| 6,526,359 B1 | * | 2/2003 | Dzombak | G01R 19/2513 702/60 |
| 2011/0144807 A1 | | 6/2011 | Buda et al. | |

* cited by examiner

*Primary Examiner* — Rina I Duda
(74) *Attorney, Agent, or Firm* — Locke Lord LLP

(57) ABSTRACT

A system and method to detect an onset of motor rotation for an induction motor. The system and method involves monitoring a power supplied to a motor via a sensor, determining a power quantity based on the power monitored by the sensor, detecting an envelope of the power quantity, detecting an onset of rotation of the motor when an amplitude of the envelope has increased, and inhibiting power flow to the motor when the onset of rotation does not occur within a predetermined time period or logging a first time period of the detected onset of rotation of the motor for use in monitoring the condition of the motor. The power quantity can be a current vector magnitude or an instantaneous power corresponding to the supplied power.

16 Claims, 15 Drawing Sheets

Dictionary

| Variable | Description |
|---|---|
| bMotorTurning | Boolean. True if motor rotation is detected |
| bPrevIvFilSlope | sign of first difference in filter output, at previous time step |
| breakawayTime | Counter value indicating elapsed time to initiate motor rotation |
| breakawayTimerValue | counter to measure the time to initiate rotation |
| bThisIvFilSlope | sign of first difference in filter output, at current time step |
| ia | Phase A current |
| ib | Phase B current |
| ic | Phase C current |
| iv | Magnitude of current vector |
| ix | First component of 2-axis representation of the current vector |
| iy | Orthogonal component of 2-axis current vector |
| negPeakCurrent | Local minimum in current vector magnitude |
| posPeakCurrent | Local maximum in current vector magnitude |
| prevEnvelope | Previous value of thisEnvelope |
| prevIvFil | Value of filter output at previous time step |
| theMotorState | Enumerated variable, values STOPPED, STARTING, RUNNING |
| thisEnvelope | difference between local maximum and previous local minimum current |
| thisIvFil | Value of filter output at current time step |
| failToStartTime | parameter |
| bFailToStartTrip | signal to trip if motor fails to start before failToStartTime |

FIG. 4

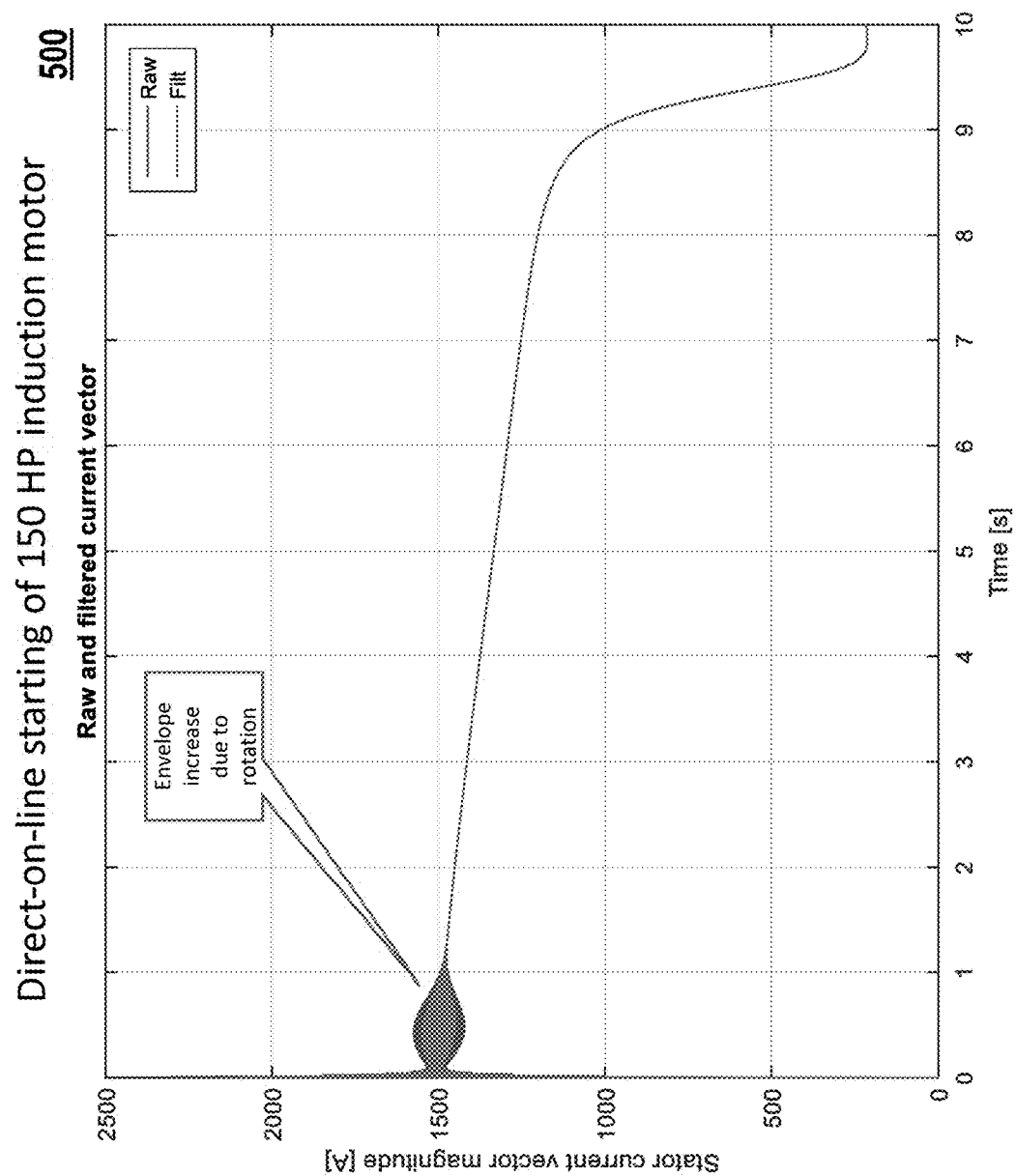

Laboratory data, 15 HP 6-pole motor

Laboratory data, 15 HP 6-pole motor

Laboratory data, 15 HP 6-pole motor

DETECTION OF INITIAL MOTOR ROTATION IN MAINS-FED INDUCTION MOTOR

FIELD

The present disclosure is related to a method and system to detect the onset of motor rotation.

BACKGROUND

State of the art protective relays implement a thermal model that will trip if the estimated thermal state reaches a limit. For example, when starting a motor, the current is a maximum value that would be experienced in practice, and the thermal state increases at a maximum rate. Motor manufacturers typically provide parameters for maximum locked rotor time (e.g., starting time), from a cold state and from a hot state. These maximum time values are typically tens of seconds. Operating the motor at locked rotor (e.g., no rotation) for the specified time results in a maximum permitted temperature rise.

More advanced protective relays will learn the typical starting time, and trip the motor off line if the starting time greatly exceeds the learned value. This function will reduce the thermal stress on the motor, compared with allowing it to run the full allowed locked rotor time. However, this decision to trip is made after a duration corresponding to the typical starting time, e.g., after the motor should have reached a full running speed or running state. If the rotor is well and truly blocked, operating at a locked rotor condition for a duration at and beyond a typical starting time imposes unnecessary thermal stress on the motor.

SUMMARY

To address these and other issues, a system and method are provided which is able to detect an onset of motor rotation or lack thereof very quickly for a motor, such as induction motor. The system and method detects for changes in an amplitude of an envelope of a power quantity. The power quantity can be a magnitude of current vector or instantaneous power, which corresponds to the power supplied to the motor. After power is supplied to the motor, an increase in the amplitude of the envelope of the power quantity would indicate an onset of motor rotation (e.g., initial rotation of the motor). When the onset of motor rotation is not detected within a predetermined time period after power is supplied to the motor, an indication of the failure of the motor to rotate can be outputted, and the power to the motor can be inhibited (e.g., stopped) to prevent unnecessary thermal stress on the motor. The "predetermined time period" can be a normal or average time for the motor to reach full running speed after power is supplied to the motor or from a starting state, or other suitable time period to reduce unnecessary thermal stress when the motor fails to rotate in a timely fashion.

In accordance with an example embodiment, a system and method involves monitoring a power supplied to a motor via a sensor, determining a power quantity based on the power monitored by the sensor, detecting an envelope of the power quantity, detecting an onset of rotation of the motor when an amplitude of the envelope has increased, and inhibiting power flow to the motor when the onset of rotation does not occur within a predetermined time period. The system and method can also detect a first time period of the onset of motor rotation, and log the first time period in a memory for use in monitoring the condition of the motor. The system and method can be implemented through a motor management relay, which includes a sensor(s) to monitor power supplied to a motor, a memory, and a processor(s). The sensor can include a current sensor and/or a voltage sensor to monitor the power supplied by a power supply to the motor. The power supply can be a three-phase AC power source, or other polyphase AC power source. A switching device, such as a contactor or other circuit interrupter, can be used to allow or inhibit power to the motor, when desired.

The system and method can also include a filter (or filtering process) to filter the power quantity to eliminate or reduce noise, such as harmonic distortions. The filter can be a low pass filter such as an infinite impulse response (IIR) filter, or a moving average filter. Furthermore, the system and method can involve calculating the time period to the onset of motor rotation, which is an elapsed time from initiation of a starting state of the motor to the detection of motor rotation and transmitting the elapsed time value to a remote system, such as a management system for an industrial facility to facilitate control and maintenance of equipment at the facility.

DESCRIPTION OF THE FIGURES

The description of the various example embodiments is explained in conjunction with the appended drawings.

FIG. 4 illustrates an example of a list of data variables for describing the implementation of the process of FIG. 3 with pseudo code and text, in accordance with an example embodiment of the present disclosure.

FIG. 5 illustrates a graph of calculated current vector magnitude, filtered current vector magnitude, and an increasing local envelope amplitude (due to motor rotation for a 150 HP motor which is started directly across AC power supply) over time based on test simulations.

DISCUSSION OF EXAMPLE EMBODIMENTS

An induction motor, which is started across-the-line, experiences an inrush of current. The inrush establishes an initial magnetic flux in the rotor. As the motor rotates, the trapped flux in the rotor creates a rotational electromagnetic force (EMF) which perturbs the stator currents. The perturbation is difficult to detect in the individual phase currents, but is more clearly manifest in the stator current vector. The perturbation is also manifest in the waveform of input power, which is supplied to the motor. The nature of the perturbation is a transient increase in the waveform, of a power quantity, such as a magnitude of the current vector (e.g., a current vector magnitude or amplitude), the instantaneous power, or equivalent quantifiable power characteristic relating to the power supplied to the motor. Detection of this transient increase is an indication that the motor has begun to rotate. Accordingly, a system and method are provided to monitor a power supplied to a motor, to detect a power quantity based on the monitored power, and to determine an onset of motor rotation (or lack thereof) based on changes, such as an increase, to an amplitude of an envelope of the power quantity. The system and method can inhibit power to the motor if the onset of motor rotation is not detected within a predetermined time (e.g., a timed out period or parameter). The predetermined time can, for example, be a predefined or a calculated time period in which the motor may normally or on average take to reach full running speed from a stopped state.

Figure 1:
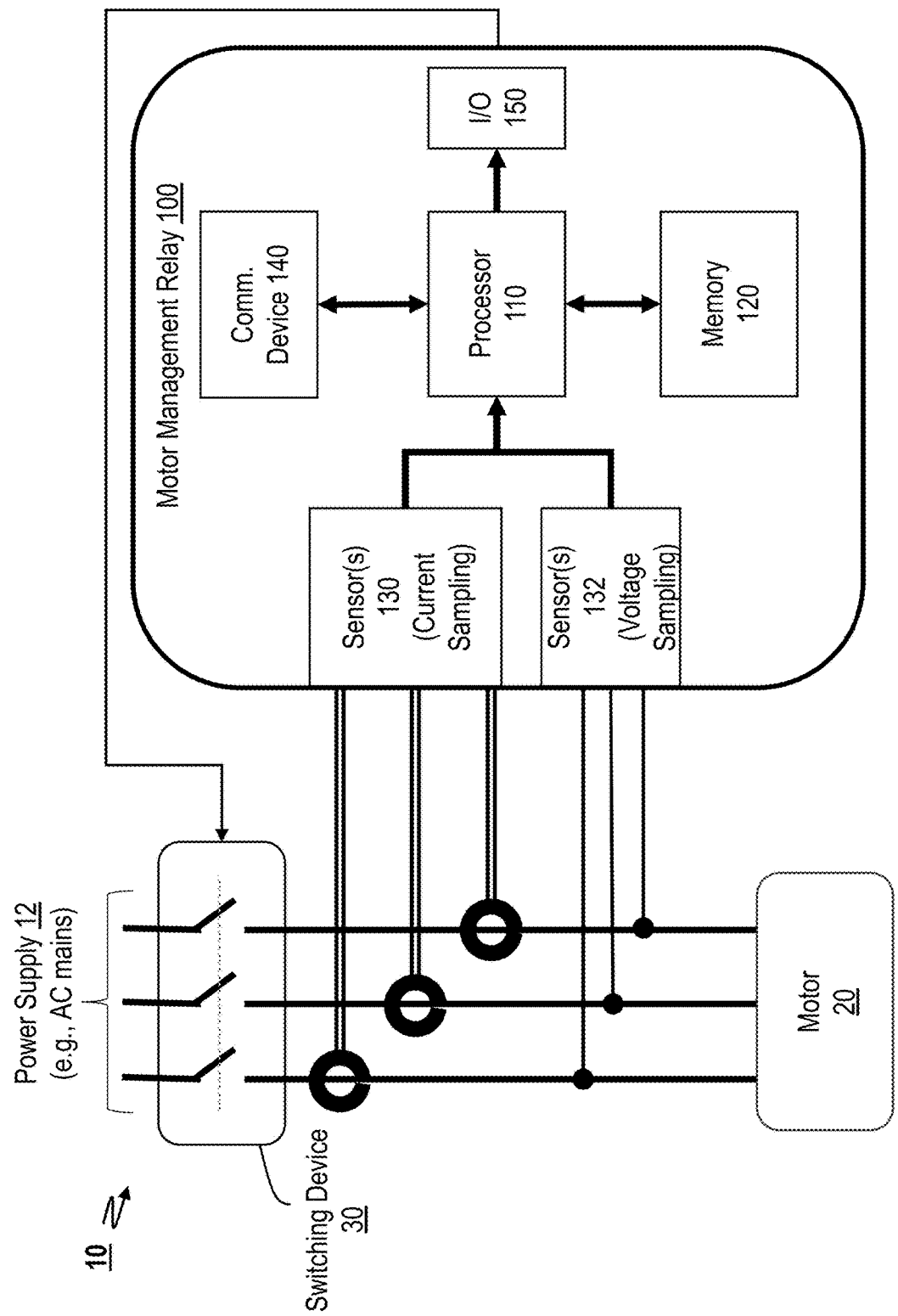
FIG. 1 illustrates a block diagram of a motor system with a motor, a switching device, and a motor management relay, in accordance with an example embodiment of the present disclosure.

FIG. 1 illustrates an example of a motor system 10, which is configured to detect an onset motor rotation or a lack of motor rotation. The motor system 10 includes a motor 20, a switching device 30 to connect or disconnect the motor 20 to or from a power supply 12 (e.g., AC mains) respectively, and a motor management relay 100 to detect an onset of motor rotation or lack thereof, to control the switching device 30 to allow or inhibit power to the motor 20 according to specific or predefined conditions or triggering events, and to output or transmit information on a state of the motor 20 including an operation state (e.g., STOPPED, STARTING and RUNNING) and/or a rotation state. In this example, the motor 20 is an induction motor; however, the motor 20 can also be a Permanent Magnet (PM) synchronous motor. The power supply 12 in this example is a three-phase power supply. The switching device 30 can for example be a circuit interrupter such as a contactor or other circuit interruption mechanism or device to selectively allow or inhibit power flow from the power supply 12 to the motor 20 or components thereof (e.g., stator).

The motor management relay 100 can include a processor(s) 110, memory 120, one or more sensors (e.g., 130, 132), communication device(s) 140, and input/output (I/O) 150, which are connected across a bus system. The motor management relay 100 can be powered by a battery, or other available power supply system (or power sources). The sensors can include, for example, a current sensor 130, voltage sensor 132 and/or other devices or systems to sense an electrical characteristic corresponding to the power supplied to the motor 20.

The memory 120 is a data storage device that can store computer executable code or programs, which when executed by the processor 110, controls the operations of the motor management relay 100. The memory 120 can also store sensor data from the sensors (e.g., 130, 132) associated with the operations of the motor 20, computed power quantity (including maximum and minimum values) over time, an amplitude of the envelope of the power quantity, an operational state of the motor 20 (e.g., STOPPED, STARTING, RUNNING), a rotational state of the motor such as an onset of motor rotation or lack thereof, history log of motor operations (e.g., states of the motor, elapsed time from start to motor rotation, etc.), or other operational data related to the motor 20. The memory 120 can also store other information (e.g., configuration information, system/device/component parameters and settings, etc.), which is used to control and operate the various components and functions of the motor management relay 100 and the motor system 10.

The communication device(s) 140 can include communication circuitry (e.g., transmitter, receiver, transceiver such as a radio frequency transceiver, etc.) for conducting communications across a network(s) with other remote devices or systems, such as a management control system for a facility (e.g., a computer system with a processor(s), memory, communication device, etc.). For example, the communication device(s) 140 can conduct line-based communications with a remote device via a USB or Ethernet cable interface, or conduct wireless communications with a remote device, such as for example through a wireless personal area network, a wireless local area network, a cellular network or wireless wide area network. The communication device(s) 140 can be used to transmit sensor data associated with the power being supplied to the motor, the state of the motor (including those described herein), or other operational data related to the motor 20.

The I/O (Input/Output) 150 includes input and output interfaces to input device(s), and output device(s), respectively. The input devices can include user input devices (e.g., buttons, dials, switches, keyboard or other user input devices) to enable a user to manually set or control operations or other features of the motor management relay 100 and the motor system 10. The output devices can include a display, lights (e.g., LEDs), or other output devices to display information related to the motor 20, such as the state of the motor including the operational and rotational state of the motor, and other operational information related to the status of the motor 20. In this example, the processor 110 can also control the switching device 30, by sending signals or commands to the switching device 30 via the I/O 150.

The processor 110 is configured to control the components and operations of the motor management relay 100. The processor 110 can be a processing system, which can include one or more processors, such as CPU, GPU, controller, dedicated circuitry or other processing unit, which controls the operations of the motor management relay 100, including but not limited to the operations to detect an onset of motor rotation or lack thereof, the communication operations via the communication device(s) 140, the data access and/or storage operations via the memory 120, and the input and/or output operations via the I/O 150. In relations to the detection operation, the processor 110 is further configured to determine a power quantity based on the power monitored by the sensor (e.g., 130 and/or 132), to filter the power quantity, to detect an envelope of the power quantity, to detect an onset of rotation of the motor when an amplitude of the envelope has increased, to inhibit power flow to the motor when the onset of rotation does not occur within a predetermined time period, to calculate and store an operational elapsed time from a STARTING state to the detection of rotation, to output or transmit information relating to the state and other information of the motor 20, or other operations described herein.

In an example embodiment, the motor 20 is a powered by a three-phase power supply. The motor management relay 100 can sample three phase currents at regular intervals, such as for example 32 samples per cycle or 1920 samples/second at 60 Hz. The processor 110 can calculate the current vector and the current vector magnitude based on the sensor data to detect and track the amplitude of the envelope of the current vector magnitude over time. Alternatively, the processor 110 can calculate the instantaneous power or other proportional or equivalent power characteristic over time. For example, the motor management relay 100 can also sample three phase voltages, and calculate the instantaneous input power to the motor 20. This quantity is optionally used instead of the current vector magnitude because, under conditions of balanced sinusoidal voltages, the magnitude of the instantaneous input apparent power (volt-amperes) is proportional to the current vector magnitude, or vice-a-versa.

Figure 2:
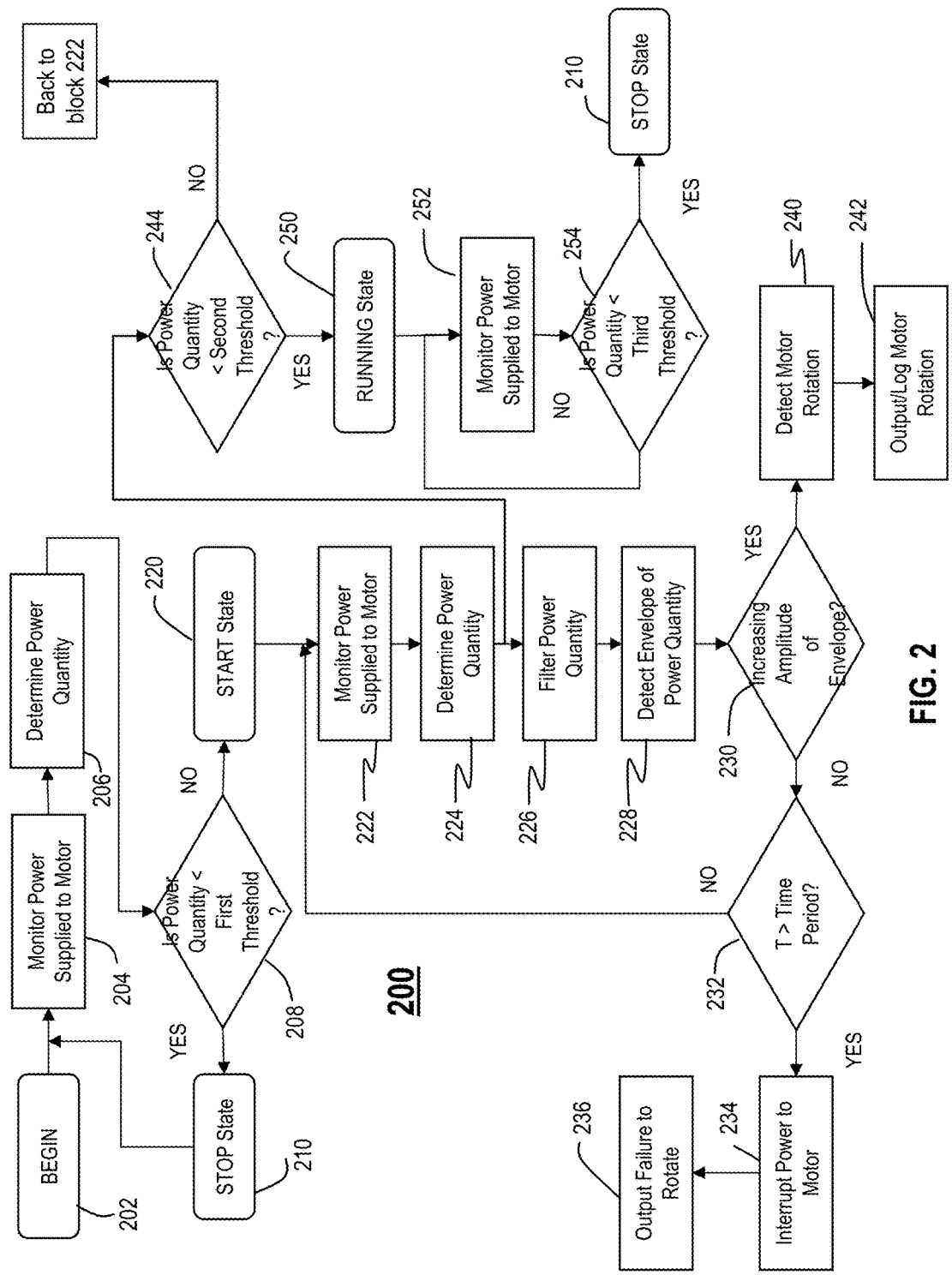
FIG. 2 illustrates an example of a process by which the motor system, such as in FIG. 1, detects motor operating states (e.g., STOPPED, STARTING, RUNNING) including an initial onset of motor rotation or lack thereof, in accordance with an example embodiment of the present disclosure.

FIG. 2 illustrates an example of a process 200 by which a motor system, such as in FIG. 1, detects motor operating states (STOPPED, STARTING, or RUNNING) including the initial onset of motor rotation in accordance with an example embodiment of the present disclosure. For the purposes of explanation, the process 20 will be described below with reference to the components of the motor system 10 of FIG. 1.

The process 200 begins at reference 202 in which power is initially supplied to the motor 20, which is in the STOPPED state. For example, the switching device 30 is placed in the closed condition to allow the flow of power to the motor 20 from the power supply 12. At reference 204, the processor 110 monitors the power supplied to the motor 20 via a sensor (e.g., sensors 130, 132). In this example, the sensor 130 is employed to sense the current supplied to the motor 20. The power can be supplied from a polyphase power supply, such as three-phase power source.

At reference 206, the processor 110 determines a power quantity based on the monitored power. The power quantity can be a magnitude of a current vector or instantaneous power (e.g., Power=Voltage (V)×Current (I)), or other electrical characteristic computed based on sensor data from the sensors (e.g., 130, 132 in FIG. 1) corresponding to the monitored power supplied to the motor 20. At reference 208, the processor 110 determines whether the power (P) supplied to the motor 20 is less than a first threshold. The first threshold is a power level at which the motor 20 transitions from the STOPPED state to the STARTING STATE. If so, the processor 110 determines that the motor 20 is in the STOPPED state at reference 210, and can output this information locally to an output device (e.g., a display) via the I/O 150 or to a remote system via the communication device 140. Otherwise, if the power is greater than or equal to the first threshold, the processor 110 determines that the motor 20 is in the STARTING state at reference 220, and can output this information locally to an output device (e.g., a display) via the I/O 150 or to a remote system via the communication device 140.

At reference 222, the processor 110 monitors or continues to monitor the power supplied to the motor 20 via the sensors (e.g., sensors 130, 132). At reference 224, the processor 110 determines a power quantity based on the power supplied to the motor 20. The processor 110 can also filter the power quantity to remove noise, such as harmonic distortions, at reference 226. The processor 110 can implement a low pass filter (e.g., infinite impulse response (IIR) low pass filter, etc.), a weighted moving-average filter (e.g., an equally weighted moving-average filter, a moving average filter with a window length equal to one-half cycle of the AC mains frequency, etc.) or other suitable filter processing scheme to reduce noise. For example, the processor 110 can implement a filter operation using the following filter equation:

$$y[k] = \frac{1}{N} \sum_{i=k-N+1}^{k} x[i]$$

where x[k] is the input data to be filtered (e.g. current vector magnitude, instantaneous power magnitude, etc.), and y[k] is the filter output.

At reference 228, the processor 110 detects the envelope of the filtered power quantity. The envelope of the power quantity is, for example, defined by minimum and maximum values of the power quantity over time. Thereafter, the processor 110 determines whether an amplitude of the envelope of the power quantity is increasing over time at reference 230. For example, the processor 110 can compare consecutive amplitudes of the detected envelope over a time period (e.g., present and prior detected envelopes, etc.) to determine if the amplitude of the envelope of the power quantity is increasing during the STARTING state, e.g., compare a difference between consecutive maximum-to-minimum values of the power quantity or between consecutive minimum-to-maximum values of the power quantity. An increase in the amplitude of the envelope is detected when a present maximum-to-minimum value is larger than a prior maximum-to-minimum value of the power quantity, or when a present minimum-to-maximum value is larger than a prior minimum-to-maximum value of the power quantity If the amplitude of the envelope is not increasing at reference 232, the processor 110 determines if a predetermined time period has passed (e.g., Time (T)>predetermined time period, or timed out scenario). The predetermined time period can correspond to a predefined or calculated time period relating to a normal or typical period for the motor 20 to reach a full running speed when started. If the elapsed time is less than the predetermined time period, the process 200 returns back to reference 222. Otherwise, if the elapsed time has passed, the processor 110 interrupts power supplied to the motor 20 or components thereof (e.g., stator) via the switching device 30. For example, the processor 110 can open a contactor to stop power flow from the power supply 12 to the motor 20 or components thereof. At reference 236, the processor 110 can output an indication of a failure of motor rotation (e.g., an alarm) locally to an output device via the I/O 150, and/or remotely to a remote system via the communication device 140.

Returning back to reference 230, if the processor 110 determines that the amplitude of the envelope is increasing, then motor rotation is detected at reference 240. At reference 242, the processor 110 outputs an indication of the onset of motor rotation locally to an output device (e.g., a display) via the I/O 150 or remotely to a remote system via the communication device 140. The processor 110 can also detect the time period of the onset of motor rotation, and log the time period in a memory for use in monitoring the condition of the motor 20, e.g., store the time period locally or at the remote system in a history log for the motor 20 or equipment associated therewith.

Turning back to reference 224, the process 200 also branches out to reference 244 in which the processor 110 determines whether the power quantity supplied to the motor is less than a second threshold during the STARTING state. The second threshold can correspond to a power level below which the motor 20 transitions from the STARTING state to the RUNNING state. If the power quantity is greater than or equal to the second threshold, the processor 110 returns back to reference 222.

If the power quantity is less than the second threshold, the processor 110 determines that the motor is in the RUNNING state at reference 250, and can output this information locally to an output device via the I/O 150 or to a remote system via the communication device 140. At reference 252, the processor 110 monitors the power supplied to the motor 20. The processor 110 determines whether the power quantity is less than a third threshold in the RUNNING state at reference 254. The third threshold defines a power threshold below which the motor is in the STOPPED state. If the power quantity is less than the third threshold, the processor 110 determines that the motor 20 is in the STOPPED state at reference 210, and can output this information locally to an output device via the I/O 150 or to a remote system via the communication device 140. Otherwise, the processor 110 returns to reference 252 to monitor the power supplied to the motor 20.

Figure 3:
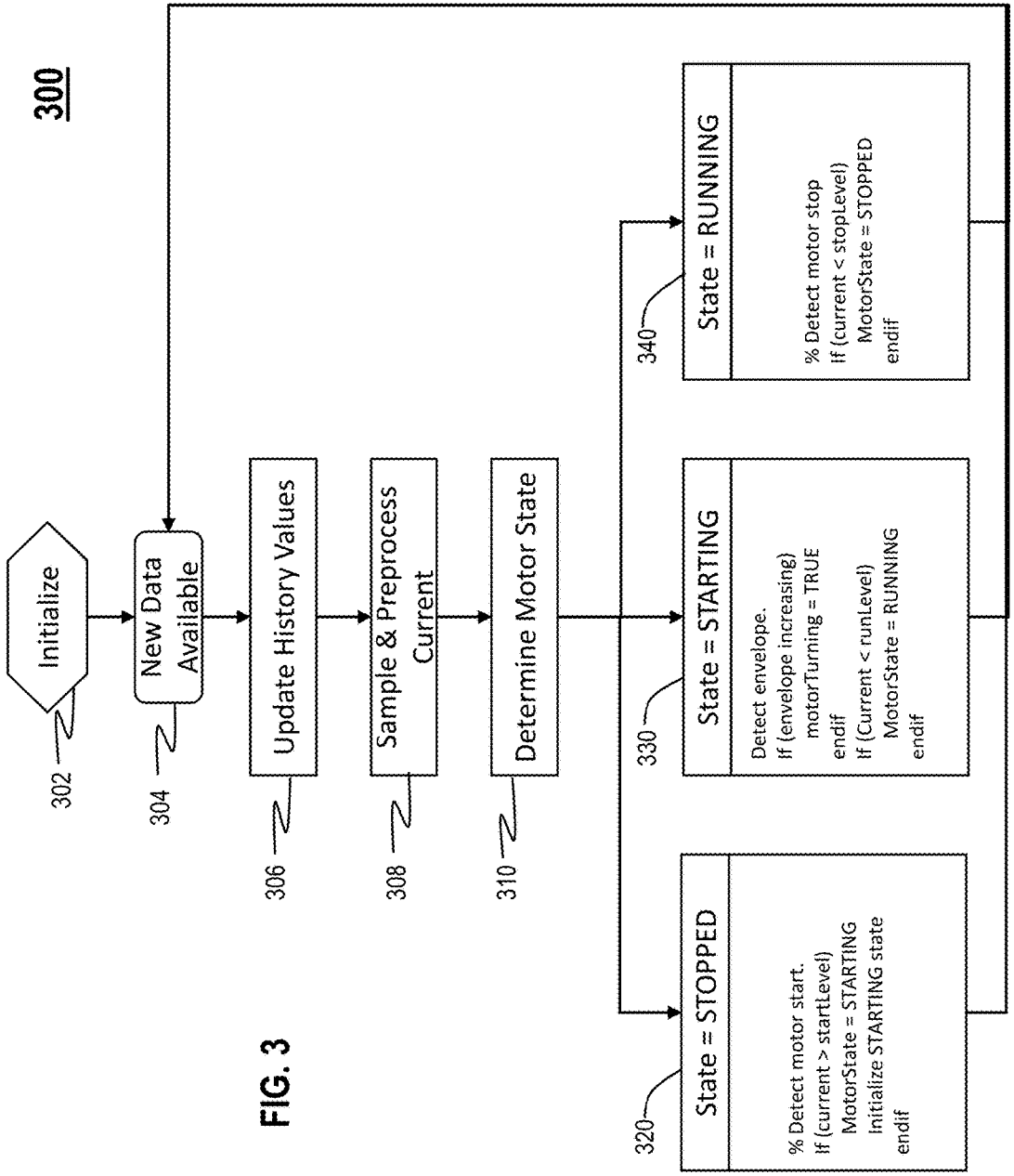
FIG. 3 illustrates another example of a process by which the motor system, such as in FIG. 1, detects motor operating states including an initial onset of motor rotation or lack thereof, in accordance with an example embodiment of the present disclosure.

FIG. 3 illustrates example of a process 300 by which the motor system, such as in FIG. 1, detects motor operating states including the initial onset of motor rotation, in accordance with an example embodiment of the present disclosure. The exemplary algorithm to detect the initial rotation of the motor, such as in the process 300 of FIG. 3, is described in detail below with a combination of text and pseudo code for the purpose of explanation. Motor states are defined in this example as STOPPED, STARTING, and RUNNING. For the purposes of explanation, the process 300 is described below with reference to the example variables in FIG. 4, and the components of the motor system 10 of FIG. 1.

In this example, threshold values are defined to distinguish boundaries between motor states, such as STOPPED, STARTING, RUNNING. The threshold values include thresholdCurr0 (e.g., motor is STOPPED when current falls below thresholdCurr0), thresholdCurr1 (e.g., marks transition from STOPPED to STARTING when current first exceeds thresholdCurr1), and thresholdCurr2 (e.g., marks transition from STARTING to RUNNING when current falls below thresholdCurr2).

In this example, the motor 20 is an induction motor operated using a three-phase power supply. When three phase currents of the power supply are balanced sinusoids, the current vector has an magnitude equal to sqrt(2) (i.e., sqrt=square root of) times the rms value of the phase current. Exemplary values of the threshold current values are expressed in terms of nameplate (NP) full load rms current NPAMPS (e.g., the motor specifications provided on a name plate on the motor 20), such as follows:

thresholdCurr0=0.02*sqrt(2)*NPAMPS thresholdCurr1=2.0*sqrt(2)*NPAMPS thresholdCurr2=1.5*sqrt(2)*NPAMPS Turning to the process 300 at reference 302, an initialization operation is performed by the processor 110 at reference 302 to initialize various parameters, such as for example as follows:

thisIvFil=0;

prevIvFil=0;

bThisIvFilSlope=0;

bPrevIvFilSlope=0;

theMotorState=STOPPED, where thisIvFil is a value of filter output at a current time step;
   prevIvFil is a value of filter output at a previous time step;
   bThisIvFilSlope is sign of first difference in filter output, at a current time step;
   bPrevIvFilSlope is sign of first difference in filter output, at a previous time step;
and
   theMotorState is an enumerated variable, with values representing the motor states of STOPPED, STARTING, or RUNNING.

At reference 304, the processor 110 receives and processes new data. For example, at reference 306, the processor 110 updates the history values:

prevIvFil=thisIvFil;

bPrevIvFilSlope=bThisIvFilSlope.

At reference 308, the processor 110 samples and preprocesses current sensed by the sensor 130. In this example, for a three-phase motor, each of the three phase currents ia, ib, ic are sampled via the sensor 130. Alternatively, two of the three phase currents can be sampled, and the third phase current can be synthesized or computed using the relationship: ia+ib+ic=0. Thereafter, the processor 110 can calculate 2-axis components of current vector (e.g., $i_x$ and $i_y$):

ix=(2*ia−ib−ic)/3; and iy=(ib−ic)/sqrt(3).

It should be understood that analogous relations also hold for polyphase motors other than 3-phase motors.

The processor 110 can then calculate the power quantity, in this example the current vector magnitude. The current vector magnitude (e.g., $i_v$) can be computed using the following equation: iv=sqrt(ix^2+iy^2). Alternatively, the magnitude of the current vector may be approximated by other means. Subsequently, the processor 110 can filter the power quantity to smooth out inaccuracies in the approximation. The filter output at a current time step is denoted by thisIvFil, as follows:

thisIvFil=doFilter(*iv*)

where dofilter (g) denotes a filtering function that acts on the input value g to yield a filter output.

An example filter or filtering function is a moving average filter with window length equal to one half cycle of the power supply 12 (e.g., AC mains), a low pass filter or other filtering schemes described herein.

The processor 110 determines a sign of current slope. The result is a Boolean value which is true when the filter output increases from one time step to the next.

bThisIvFilSlope=thisIvFil>prevIvFil;

At reference 310, the processor 110 determines the motor state (also referred to as "theMotorState") and at references 320, 330, and 340 the processor 110 processes data according to the motor state, such as STOPPED, STARTING, or RUNNING state, respectively.

For example, with respect to reference 320, the STOPPED state is denoted as follows: theMotorState: STOPPED. In this state the filtered current is monitored to see if it has exceeded the motor start threshold thresholdCurr1 (e.g., current>startLevel). If so, the processor 110 changes theMotorState to the STARTING state, and initializes the variables for the STARTING state as described in FIG. 4, such as follows.

```
if (thisIvFil > thresholdCurr1)
    theMotorState = STARTING
    breakawayTimerValue = 0
    posPeakCurrent= 0
    negPeakCurrent = 0
    thisEnvelope = 0;
    prevEnvelope = inf;       % set to machine infinity
    bMotorTurning = false
    bFailToStartTrip = false
endif
```

With respect to reference 330, the STARTING state is denoted as follows: theMotorState: STARTING. In the STARTING state, the envelope of the filtered current vector is monitored. An increase in the amplitude of the envelope indicates that the motor has started to turn. Envelope detection is achieved by detecting the local peaks (extrema) of the filtered current vector, and computing the difference between successive local maximum and minimum values. The actions depend on whether the filtered current vector is increasing or not, such as described as follows:

```
breakawayTimerValue = breakawayTimerValue + 1
% check to see if this has gone on too long. Trip if it has.
if (breakawayTimerValue > failToStartTime) and (not bMotorTurning)
    bFailToStartTrip = true
endif
if prevIvFilSlope
    % Current was increasing. Check for slope change
    if (not bThisIvFilSlope)
        % slope has changed. Latch local maximum value, which
        % was previous value
        posPeakCurrent    = prevIvFil
        % Calculate envelope
        thisEnvelope      = posPeakCurrent – negPeakCurrent
        % If the envelope amplitude is increasing, set the
        % motor turning indicator
        If thisEnvelope > prevEnvelope
            bMotorTurning = true
            breakawayTime = breakawayTimerValue
    endif
else
    % Current was decreasing. Check for slope change
    if (bThisIvFilSlope)
        negPeakCurrent    = prevIvFil
    endif
endif
% check to see if starting phase has completed
if (thisIvFil)
    theMotorState = RUNNING
endif
```

While in the STARTING state, if the motor rotation is detected, the processor 110 also determines whether the filtered output is less than the threshold thresholdCurr2 (e.g., current<runLevel). If so, the processor changes the MotorState to the RUNNING state.

With respect to reference 340, the RUNNING state is denoted as follows: theMotorState: RUNNING. In this state, the processor 110 determines whether the filtered output is less than the threshold thresholdCurr0 (e.g., current<stopLevel). If so, the processor 110 determines that the motor 20 has stopped. Example pseudo code of this operation is described below.

```
% Here we check to see if the motor has stopped
if thisIvFil < thresholdCurr0
    theMotorState = STOPPED
endif
```

Various test simulations and lab tests were conducted to test the motor rotation detection method. Example test results from test simulations of a 150 HP (Horsepower), 460V, 60 Hz, 4-pole induction motor are described in the graphs in FIGS. 5-11. In these simulation examples, the motor was started directly across the AC mains, was driven with a centrifugal load equal to 135 HP at 1800 rpm, and had a load inertia of 38 Kg-m$^2$, 17 times the motor inertia.

Figure 6:
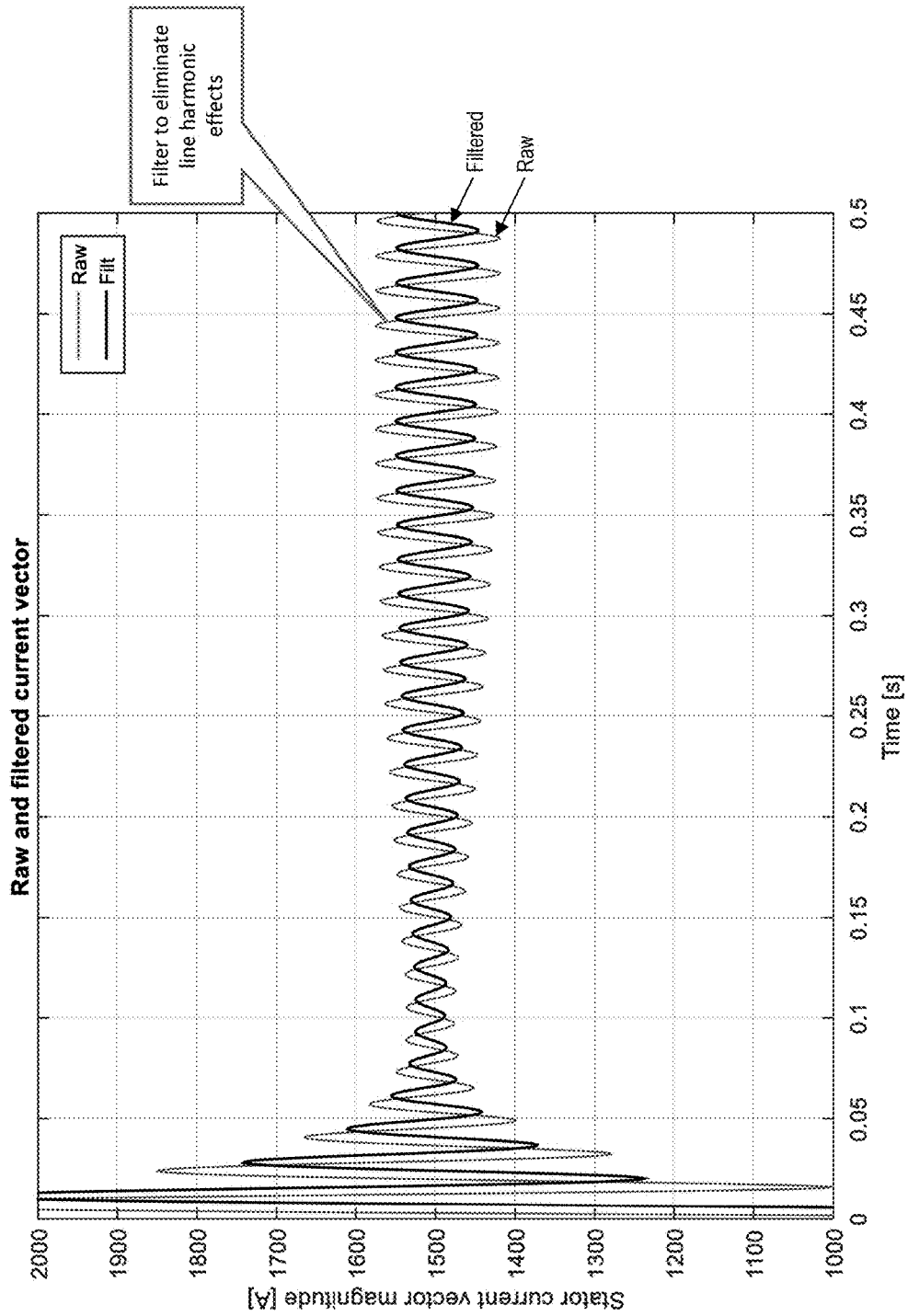
FIG. 6 illustrates an enlarged view of a portion of the graph in FIG. 5, showing the raw calculated current vector magnitude and a low pass filtered value used in subsequent calculations.
Figure 7:
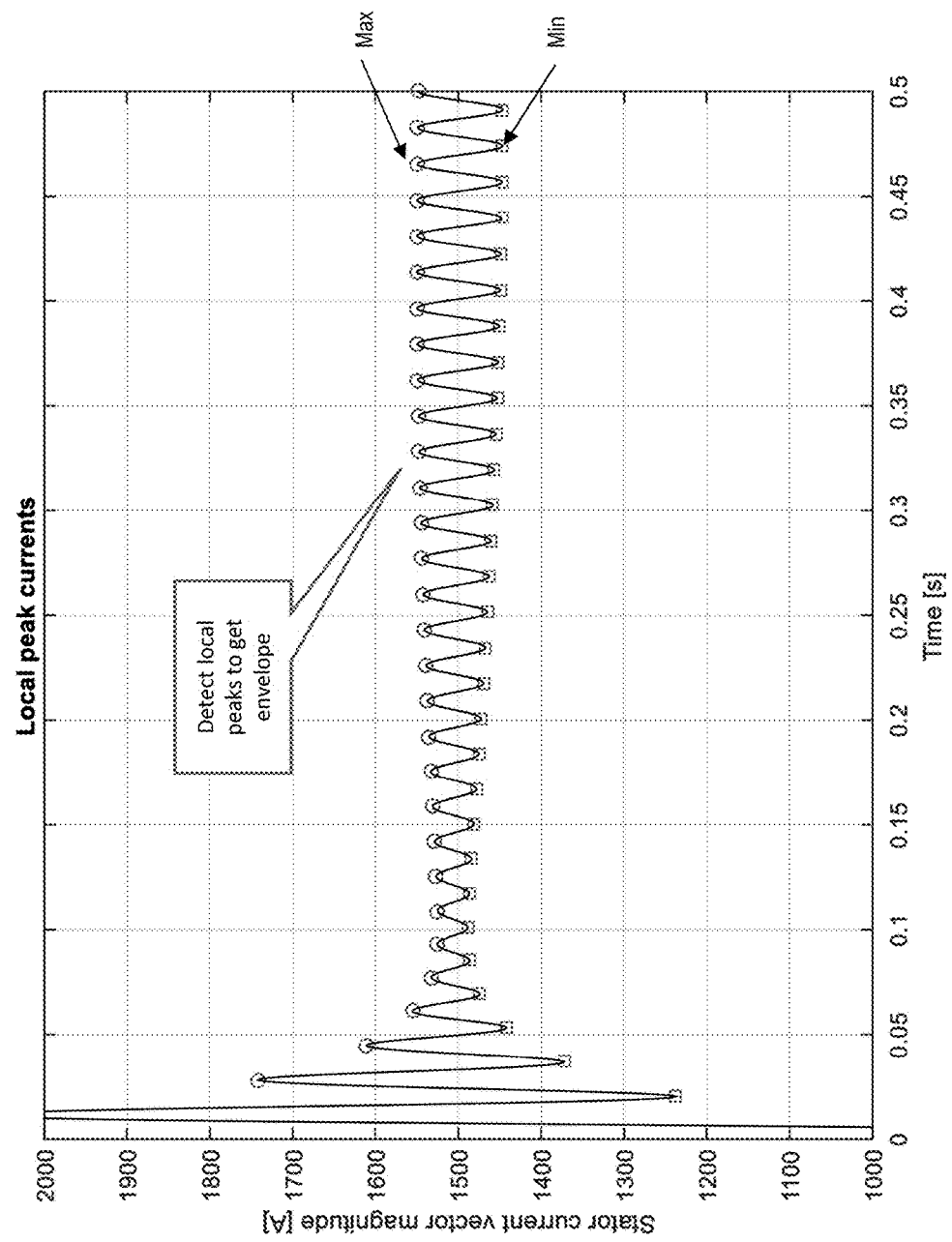
FIG. 7 illustrates an enlarged view of a portion of the graph in FIG. 5 of the filtered current vector magnitude, with local minimum and maximum indicated.

Turning to FIG. 5, there is graph 500 of simulated results of a 150 HP induction motor. In the graph 500, there is shown the calculated current vector magnitude (also referred to as the raw current vector magnitude), and the filtered current vector magnitude over time. As shown in FIG. 5, there is an oscillatory component of current vector magnitude immediately after the initial inrush of current when power is supplied to the motor. The envelope of this oscillation begins to decrease as the initial flux transient decays. The rotation of the rotor creates a rotational EMF (electromotive force, or voltage) which causes an increase in the envelope amplitude of the power quantity, e.g., current vector magnitude. That is, the motor rotation is demonstrated by the increase in the envelope amplitude. FIG. 6 shows an enlarged view of a portion of the raw and filtered current vector waveforms of FIG. 5 to better show the increase in the local envelope amplitude of the current vector magnitude. As shown by the dialog box, the raw current vector magnitude is to be filtered to eliminate line harmonic effects. FIG. 7 illustrates an enlarged view of the portion of the filtered current vector waveform in FIG. 5, showing the detection of the local minimum and/or maximum of the envelope of the filtered current vector magnitude over time.

Figure 8:
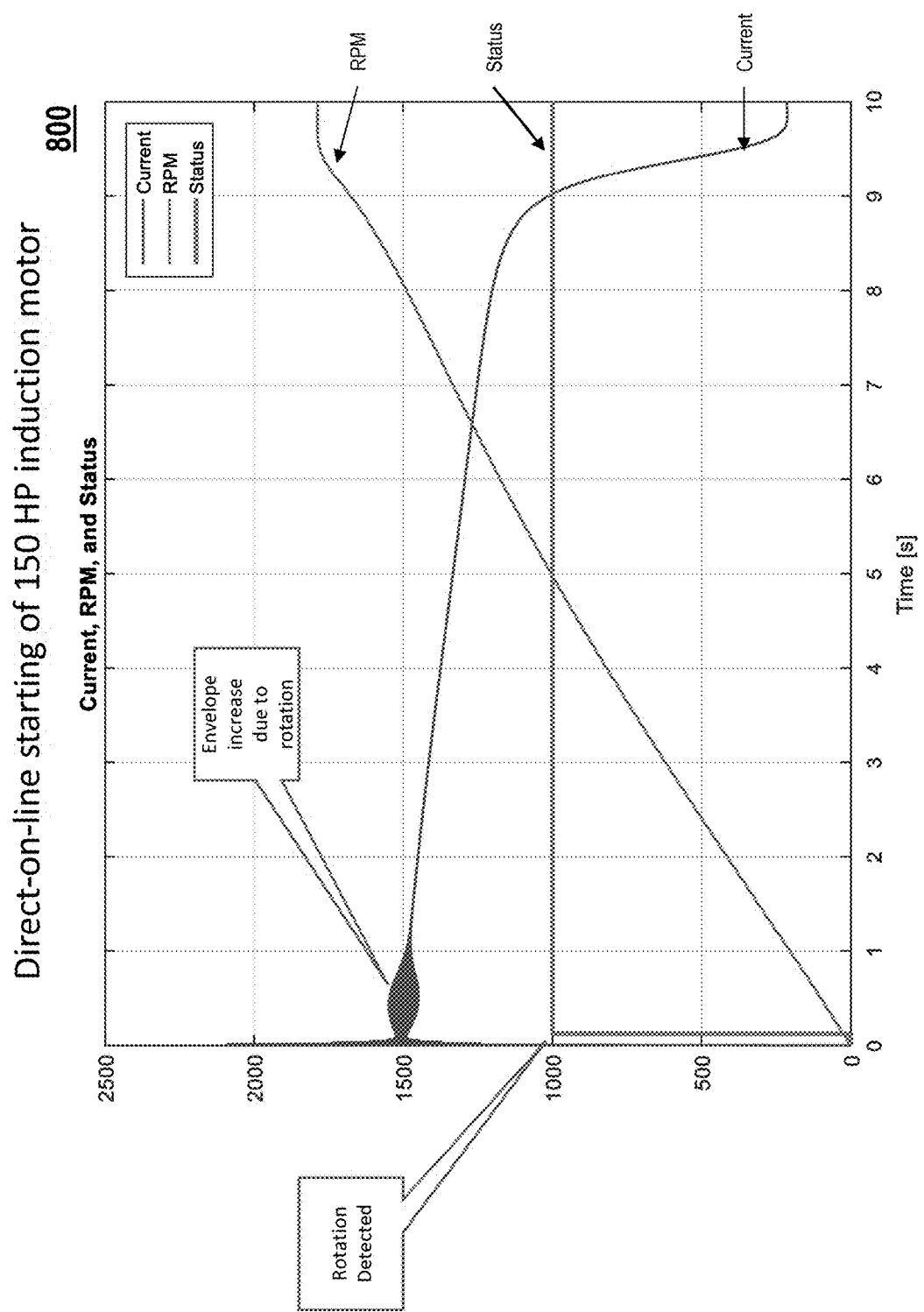
FIG. 8 illustrates a graph of the filtered current vector magnitude, motor speed in revolutions per minute (rpm), and the motor rotation status over time related to FIG. 5.
Figure 9:
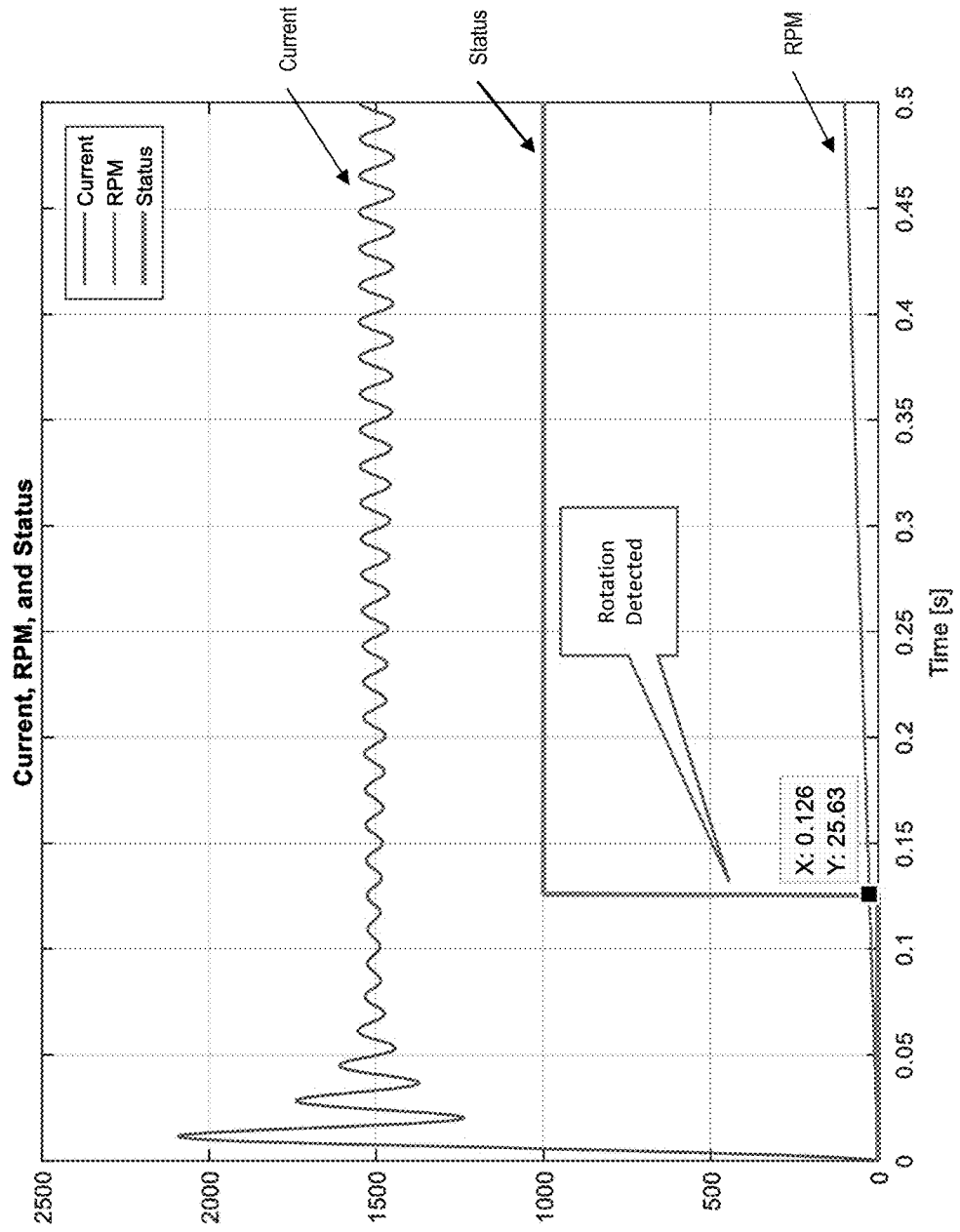
FIG. 9 illustrates an enlarged view of a portion of a graph of waveforms of FIG. 8, showing that the start of rotation was detected at time of 0.126 seconds, when the rotor speed was 25.63 rpm.

FIG. 8 shows a graph 800 of the filtered current vector magnitude of FIG. 5 along with the motor speed in rpm, and the motor rotation status. As shown in FIG. 8, the detection of motor rotation coincides with the increase in the amplitude of the envelope of the filtered current vector magnitude. For example, as previously discussed above, a difference between consecutive maximum-to-minimum values of the power quantity or between consecutive minimum-to-maximum values of the power quantity can be compared to detect whether the amplitude of the envelope is increasing. An increase in the amplitude of the envelope is detected when a present maximum-to-minimum value is larger than a prior maximum-to-minimum value of the power quantity, or when a present minimum-to-maximum value is larger than a prior minimum-to-maximum value of the power quantity. FIG. 9 is an enlarged view of a portion of the waveforms of FIG. 8. As shown in greater detail in FIG. 9, the start of rotation was detected at time of 0.126 seconds, when the rotor speed was 25.63 rpm.

Figure 10:
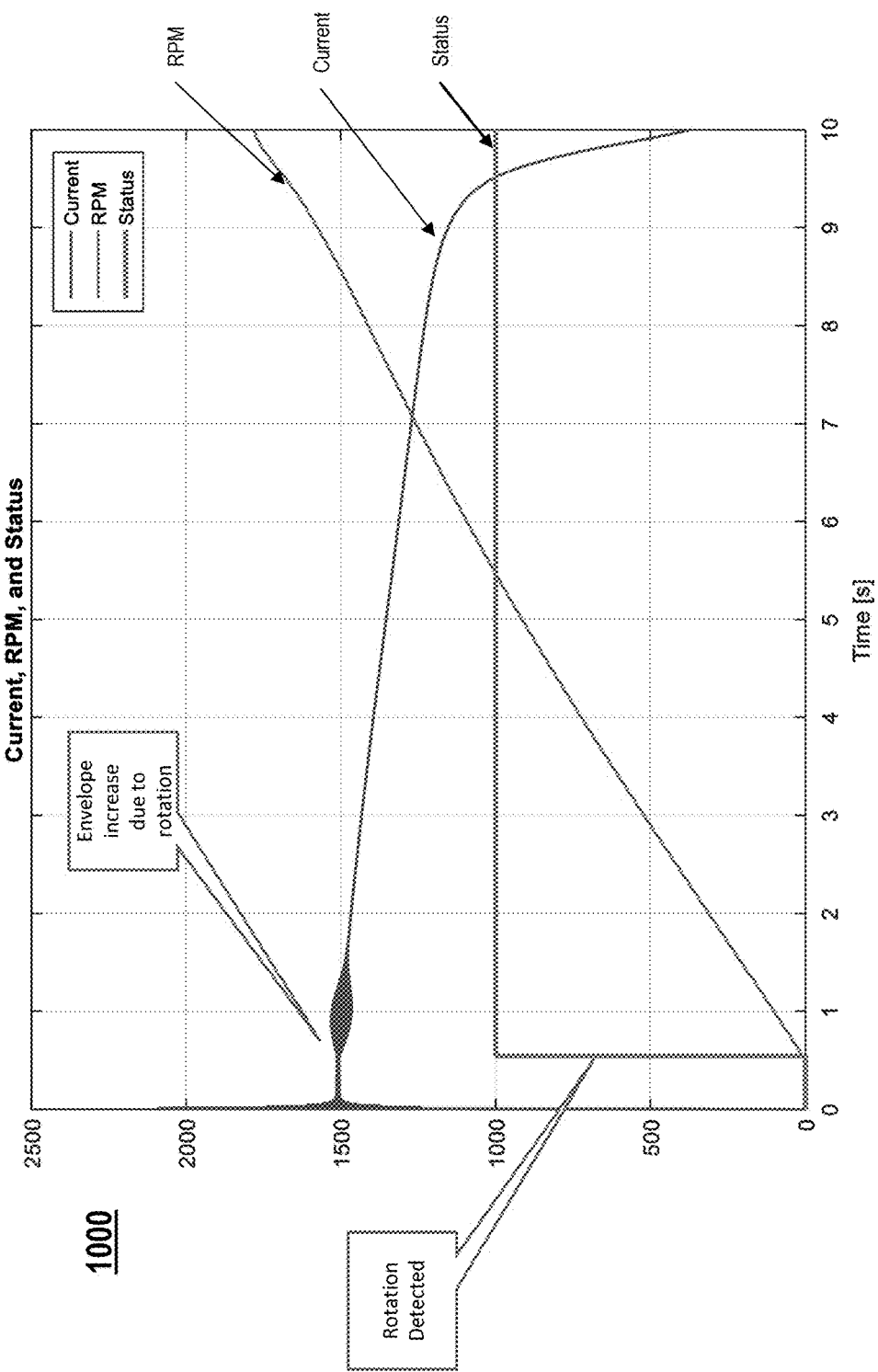
FIG. 10 illustrates a graph of filtered current magnitude, motor speed, and rotation status over time based on test simulations, in which the rotor was blocked for 0.5 seconds before being allowed to rotate.
Figure 11:
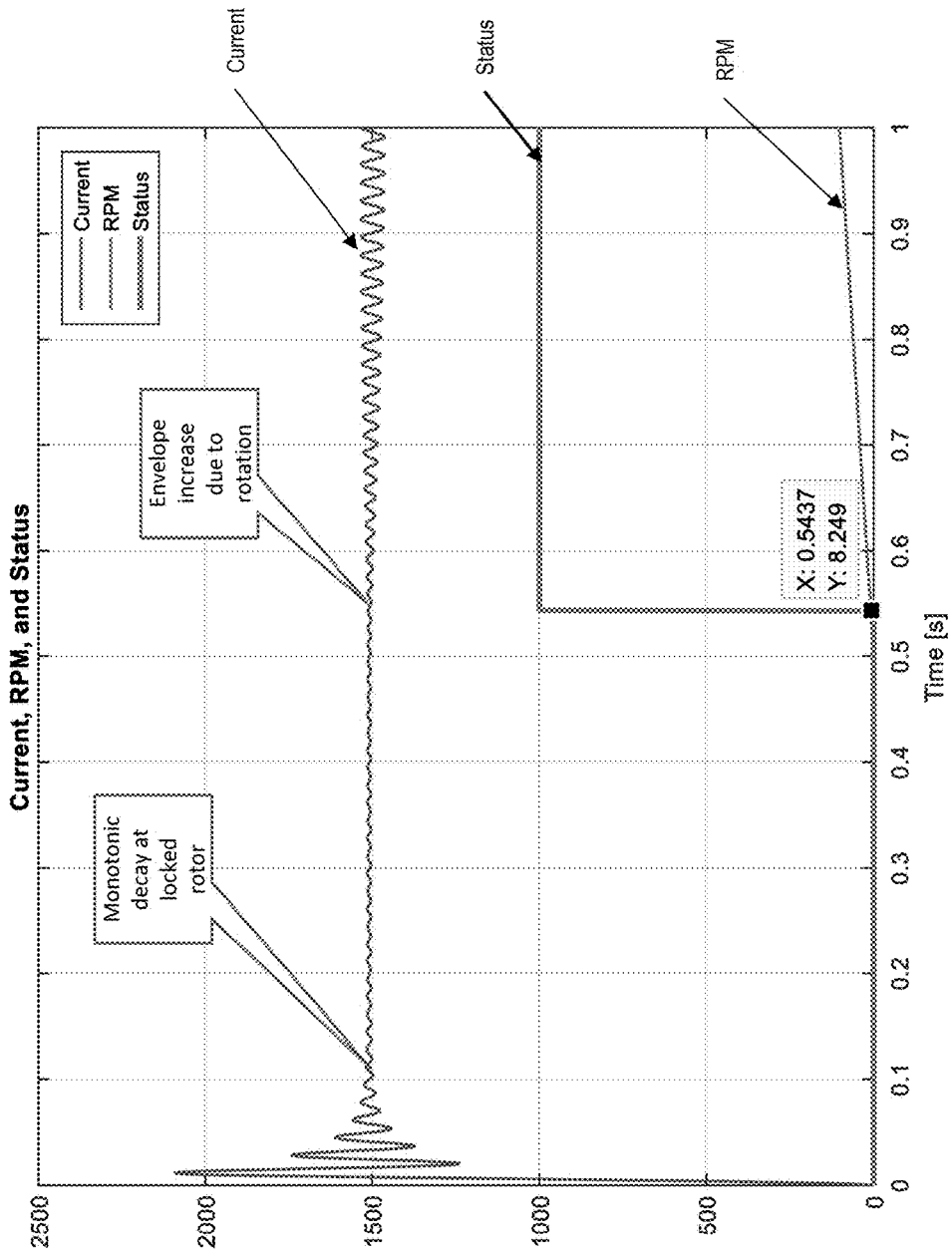
FIG. 11 illustrates an enlarged view of a portion of the waveforms of FIG. 10 in which the rotation is detected at time equal to 0.5437 seconds (43.7 ms after start of rotation) at a rotor speed of 8.249 rpm.

FIG. 10 shows a graph 1000 of waveforms of the filtered current magnitude, motor speed (rpm), and rotation status based on test simulations. In FIG. 10, the rotor was blocked for 0.5 seconds before being allowed to rotate. As further shown in FIG. 11, rotation is detected at a time equal to 0.5437 seconds (43.7 milli-seconds (ms) after start of rotation) at a rotor speed of 8.249 rpm.

Figure 12:
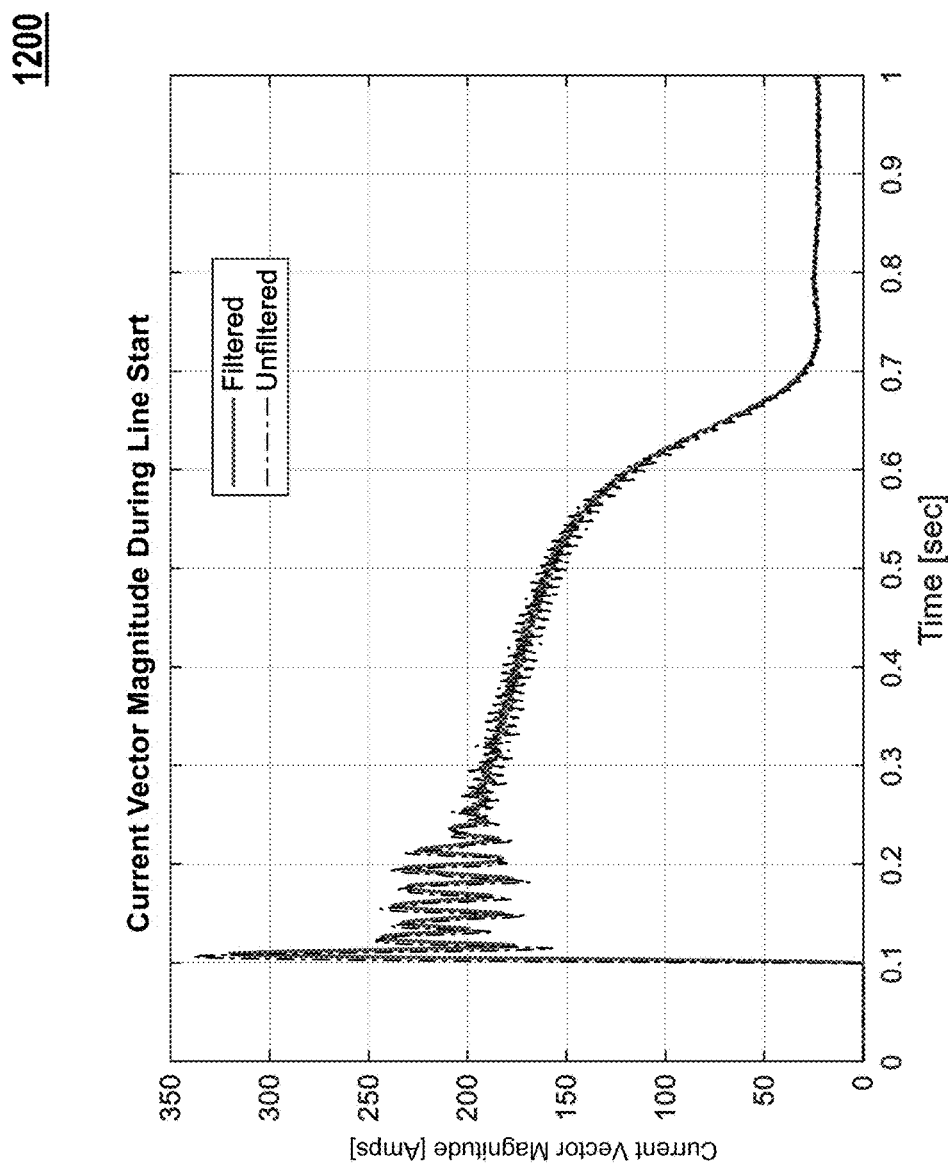
FIG. 12 illustrates a graph showing a calculated current vector magnitude, filtered current vector magnitude, the motor speed in rpm, and the motor rotation status from experimental test data for a 15 HP 6-pole motor.
Figure 13:
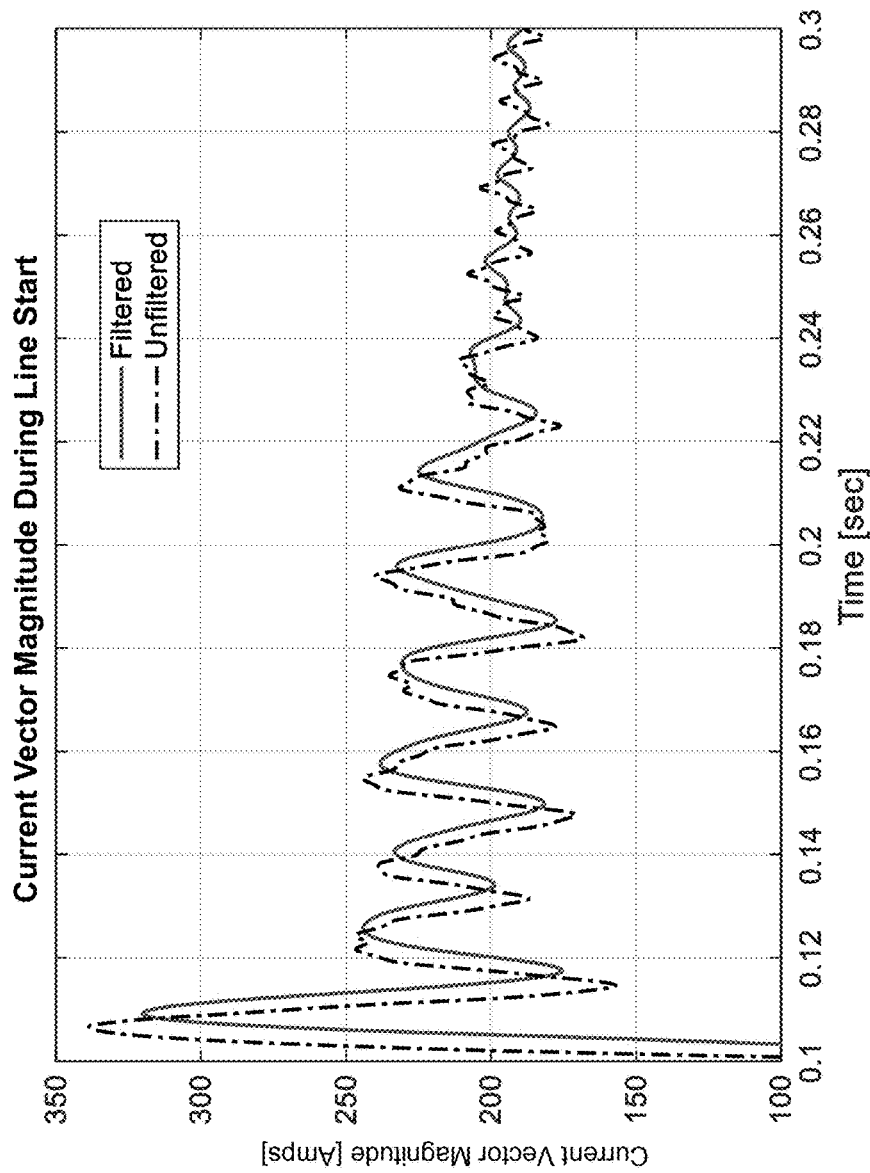
FIG. 13 illustrates an enlarged view of a portion of the graph of the waveforms in FIG. 12, showing the raw calculated vector magnitude and a low pass filtered value used in subsequent calculations.
Figure 14:
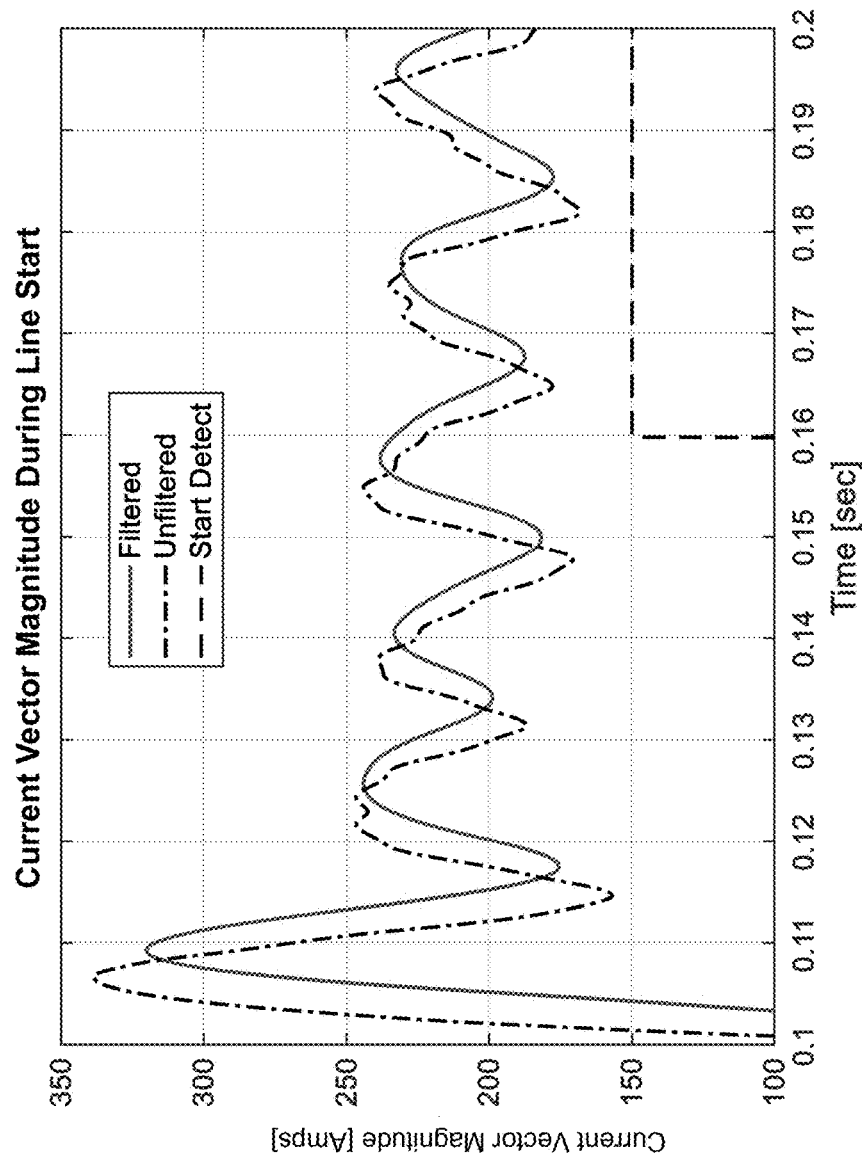
FIGS. 14 and 15 illustrate an enlarged view of a portion of the waveforms in FIG. 13 of the raw and filtered current vector magnitude.
Figure 15:
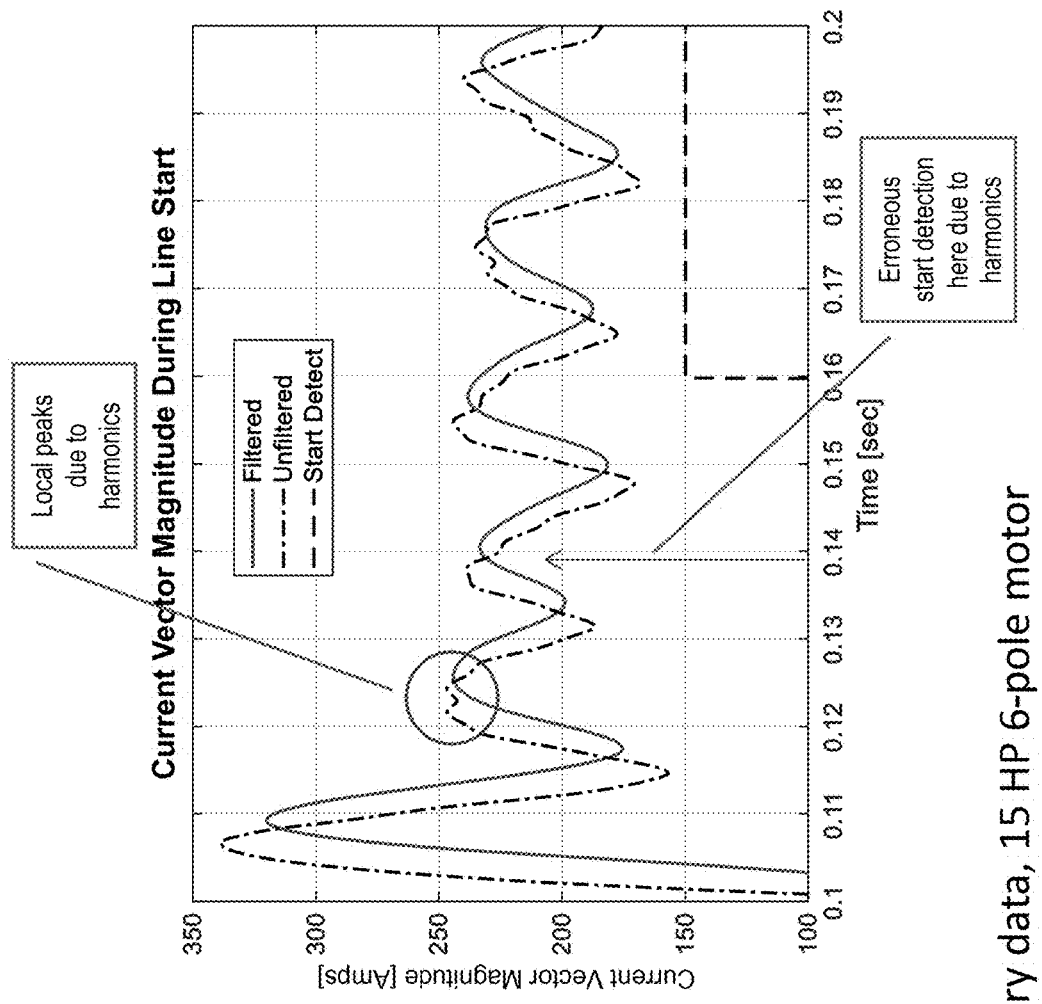

Example test results from experimental lab tests of a 15 HP 6-pole induction motor are described in the graphs of FIGS. 12-15. FIG. 12 shows a graph 1200 of lab results from the 15 HP induction motor. In the graph 1200, there is shown the calculated current vector magnitude (also referred to as the raw current vector magnitude), and the filtered current vector magnitude over time. As shown in FIG. 12, motor rotation is demonstrated by the increase of the local envelope amplitude of the power quantity, e.g., current vector magnitude. FIG. 13 shows an enlarged view of a portion of the raw (unfiltered) and filtered current vector waveforms of FIG. 12 to better show the increase in the local envelope amplitude of the current vector magnitude. FIGS. 14 and 15 illustrate an enlarged view of the portion of the raw and filtered current vector waveform in FIG. 12, showing the detection of the local minimum and/or maximum of the envelope of the raw and filtered current vector magnitude over time. The onset of motor rotation is detected at a time of 0.16 seconds. As further shown in FIG. 15, the calculated current vector waveform is filtered to address noise, such as those due to harmonic distortions, which may otherwise result in an erroneous detection of the onset of motor rotation if the raw data is used.

It should be understood that motor system and method described herein are provided as examples, and can be implemented to determine an onset of motor rotation for induction motors, PM synchronous motors or motors in which a rotational EMF (electromotive force, or voltage) of a rotor or moving element causes an increase in the envelope amplitude of a power quantity corresponding to the power supplied to the motor. The motor can be a polyphase motor, which is powered by a polyphase power supply.

It should also be understood that the example embodiments disclosed and taught herein are susceptible to numerous and various modifications and alternative forms. Thus, the use of a singular term, such as, but not limited to, "a" and the like, is not intended as limiting of the number of items.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices can include, but are not limited to, disks, solid state drives, optical disks, removable memory devices such as smart cards, SIMs, WIMs, semiconductor memories such as RAM, ROM, PROMS, etc. Transmitting mediums include, but are not limited to, transmissions via wireless communication networks (e.g., Radio Frequency (RF) communication, the Internet, intranets, telephone/modem-based network communication, hard-wired/cabled communication network, satellite communication, and other stationary or mobile network systems/communication links.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A system for detecting an onset of motor rotation, the system comprising:
   a sensor to monitor power supplied to a motor;
   a memory; and
   a processor configured:
   to determine a power quantity based on the power monitored by the sensor;
   to detect an envelope of the power quantity;
   to detect an onset of rotation of the motor when an amplitude of the envelope has increased; and
   to inhibit power flow to the motor when the onset of rotation does not occur within a predetermined time period or log a first time period of the detected onset of rotation of the motor for use in monitoring the condition of the motor.

2. The system of claim 1, further comprising:
   an interrupter to inhibit power to the motor,
   wherein the processor causes the interrupter to inhibit power to the motor when the onset of rotation is not detected within a predetermined time period.

3. The system of claim 1, wherein the motor is an induction motor, and the sensor monitors the power supplied to a stator of the motor.

4. The system of claim 1, wherein the power quantity is a magnitude of a current vector or instantaneous power corresponding to the power supplied to the motor.

5. The system of claim 1, wherein the predetermined time period relates to a time period for the motor to reach full rotational speed.

6. The system of claim 1, wherein the processor is further configured to filter the power quantity to remove noise.

7. The system of claim 1, wherein, to detect the envelope of the power quantity and an onset of rotation of the motor when an amplitude of the envelope has increased, the processor is configured:
   to detect one of a minimum and maximum of the power quantity;
   to detect a subsequent one of the other of the minimum and maximum of the power quantity;
   to determine a difference between the detected minimum and maximum of the power quantity;
   to compare a difference between consecutive maximum-to-minimum values of the power quantity or between consecutive minimum-to-maximum values of the power quantity; and
   to determine whether the amplitude of the envelope of the power quantity has increased based on the difference.

8. The system of claim 1, wherein the processor is further configured:
   to calculate the first time period which comprises an elapsed time from initiation of a starting state of the motor to the detection of motor rotation.

9. A method of detecting an onset of motor rotation, the method comprising:
   monitoring power supplied to a motor via a sensor;
   determining a power quantity based on the power monitored by the sensor;
   detecting an envelope of the power quantity;
   detecting an onset of rotation of the motor when an amplitude of the envelope has increased; and
   one of inhibiting power flow to the motor when the onset of rotation does not occur within a predetermined time period or logging a first time period of the detected onset of rotation of the motor for use in monitoring the condition of the motor.

10. The method of claim 9, wherein an interrupter inhibits power to the motor when the onset of rotation is not detected within a predetermined time period.

11. The method of claim 9, wherein the power quantity is a magnitude of a current vector or of instantaneous power corresponding to the power supplied to the motor.

12. The method of claim 9, wherein the predetermined time period relates to a time period for the motor to reach full rotational speed.

13. The method of claim 9, further comprising:
   filtering the power quantity to remove noise.

14. The method of claim 9, wherein, the detecting the envelope of the power quantity and an onset of rotation of the motor comprises:
   detecting one of a minimum and maximum of the power quantity;
   detecting a subsequent one of the other of the minimum and maximum of the power quantity;
   determining a difference between the detected minimum and maximum or the detected maximum and minimum of the power quantity;
   comparing a difference between consecutive maximum-to-minimum values of the power quantity or between consecutive minimum-to-maximum values of the power quantity; and
   determining whether the amplitude of the envelope of the power quantity has increased based on the difference.

15. The method of claim 9, further comprising:
   calculating the first time period which comprises an elapsed time from initiation of a starting state of the motor to the detection of motor rotation.

16. A tangible memory medium storing executable code which, when executed by one or more processors, implements a method of detecting an onset of motor rotation, the method comprising:
   monitoring power supplied to a motor via a sensor;
   determining a power quantity based on the power monitored by the sensor;
   detecting an envelope of the power quantity;
   detecting an onset of rotation of the motor when an amplitude of the envelope has increased; and
   one of inhibiting power flow to the motor when the onset of rotation does not occur within a predetermined time period or logging a first time period of the detected onset of rotation of the motor for use in monitoring the condition of the motor.

* * * * *